United States Patent [19]

Dangschat

[11] 4,444,069
[45] Apr. 24, 1984

[54] PLAY-FREE PRECISION DRIVE APPARATUS

[75] Inventor: Holmer Dangschat, Traunreut, Fed. Rep. of Germany

[73] Assignee: Dr. Johannes Heidenhain GmbH, Traunreut, Fed. Rep. of Germany

[21] Appl. No.: 232,962

[22] Filed: Feb. 9, 1981

[30] Foreign Application Priority Data

Feb. 12, 1980 [DE] Fed. Rep. of Germany ....... 3005147

[51] Int. Cl.$^3$ ...................... F16H 13/00; F16H 13/12
[52] U.S. Cl. ........................................ 74/209; 74/210;
369/269; 74/DIG. 4
[58] Field of Search ................. 74/202, 206, 207, 205,
74/209, 210, 99 R, 89, 25, DIG. 4; 369/269

[56] References Cited

U.S. PATENT DOCUMENTS

| 2,092,714 | 9/1937 | Flygare . | |
|---|---|---|---|
| 2,566,674 | 9/1951 | Odenthal . | |
| 2,598,138 | 5/1952 | Sharp . | |
| 2,774,247 | 12/1956 | Knost . | |
| 2,902,871 | 9/1959 | Mooar . | |
| 2,912,868 | 11/1959 | Preskitt . | |
| 3,528,309 | 9/1970 | Laybourn | 74/202 |
| 3,589,202 | 6/1971 | Stanley . | |
| 3,999,364 | 12/1976 | Raschle | 74/210 |
| 4,048,788 | 9/1977 | Kamlukin et al. . | |
| 4,093,056 | 6/1978 | Burgers . | |
| 4,250,763 | 2/1981 | Dangschat . | |

FOREIGN PATENT DOCUMENTS

| 79696 | 12/1919 | Austria . | |
|---|---|---|---|
| 766792 | 10/1971 | Belgium . | |
| 621479 | 10/1935 | Fed. Rep. of Germany . | |
| 896746 | 7/1949 | Fed. Rep. of Germany . | |
| 1216058 | 5/1966 | Fed. Rep. of Germany . | |
| 2846138 | 4/1979 | Fed. Rep. of Germany | 74/89 |
| 1194176 | 11/1959 | France . | |
| 1352140 | 1/1964 | France . | |
| 240002 | 4/1946 | Switzerland . | |
| 538110 | 7/1973 | Switzerland . | |
| 246267 | 1/1926 | United Kingdom . | |
| 708235 | 4/1954 | United Kingdom . | |

Primary Examiner—John E. Murtagh
Assistant Examiner—Andrew Joseph Rudy
Attorney, Agent, or Firm—Willian, Brinks, Olds, Hofer, Gilson & Lione Ltd.

[57] ABSTRACT

A play-free precision drive apparatus is disclosed which comprises a rotatable drive element (2, 20) for driving a driven element (8, 21), a biasing element (12, 26) for urging the driven element (8, 21) into engagement with the drive element (2, 20), and two rotatable support elements (11, 22) abutting the drive element (2, 20) along its periphery for holding the drive element (2, 20) against the driven element (8, 21). The support elements (11, 22) are positioned such that the centers of the support elements (11, 22) and the center of the drive element (2, 20) define an angle ($A_1$, $A_{21}$) of less than 180° having its apex at the center of the drive element (2, 20) and such that the centers of the support elements (11, 22) define a line ($L_3$, $L_{23}$) parallel to a tangent to the drive element (2, 20) which passes through a contact point between the drive element (2, 20) and the driven element (8, 21). Although the drive element (2, 20) and the support elements (11, 22) are mounted on standard bearings which have play, the precision drive apparatus has substantially no play in the direction of drive.

12 Claims, 3 Drawing Figures

PLAY-FREE PRECISION DRIVE APPARATUS

BACKGROUND OF THE INVENTION

The present invention relates to an improved, play-free precision drive apparatus.

In order to make a drive apparatus high precision, bearings that have substantially no play are required to carry the drive element. For this purpose, it is a known practice to mount the drive element on axially or radially biased roller bearings, such as conical roller bearings, shoulder bearings, or "ball guides" (Kügelfuhrungen). Such biased bearings however have the disadvantage that they are relatively difficult to rotate because the relatively high drag generated by the bias tension, which is often applied to all of the roller, or ball, elements of the bearing. In addition, biased bearings generally do not permit high speeds of rotation, they are relatively difficult to adjust, and they are relatively easily damaged.

It is also known to utilize aerostatic or hydrostatic bearings in such play-free drives, but their use is complicated by the fact that they require fluid pumps such as air or oil pumps for their operation.

SUMMARY OF THE INVENTION

The present invention is directed to an improved play-free precision apparatus which avoids the above-mentioned disadvantages of the prior art.

According to this invention, a play-free precision drive apparatus for a driven element comprises a rotatable drive element for driving the driven element, support elements for the drive element, and biasing means for the driven element. Preferably, the rotatable drive element is abutted along its periphery by two rotatable support elements. The support elements are positioned such that the centers of the support elements and the center of the drive element define an angle of less than 180° having its apex at the center of the drive element, and the centers of the support elements define a line parallel to a tangent of the drive element at the contact point between the drive element and the driven element. The support elements hold the drive element against the driven element. The biasing means urges the driven element against the drive element.

One important advantage achieved with this invention is that a play-free precision drive may be constructed in which the drive element, as well as the support elements, are mounted on standard bearings which do have play, and yet the resulting apparatus is substantially without play in the drive direction.

Another advantage achieved by the present invention is that substantially only some of the roller, or ball, elements of those support element bearings which are closest to the contact point between the support element and the drive element bear the force of contact between the drive element and the driven element. As biased bearings need not be used, the drag generated by bearing bias tension on the roller, or ball, elements of bearings is eliminated. This arrangement has the additional advantages of proving a low-friction, easily rotating drive which is capable of turning at high speeds.

Other objects and advantages of the invention will become apparent during the following description of the presently preferred embodiments of the invention.

DETAILED DESCRIPTION OF THE PREFERRED EMBODIMENTS

Figure 1:
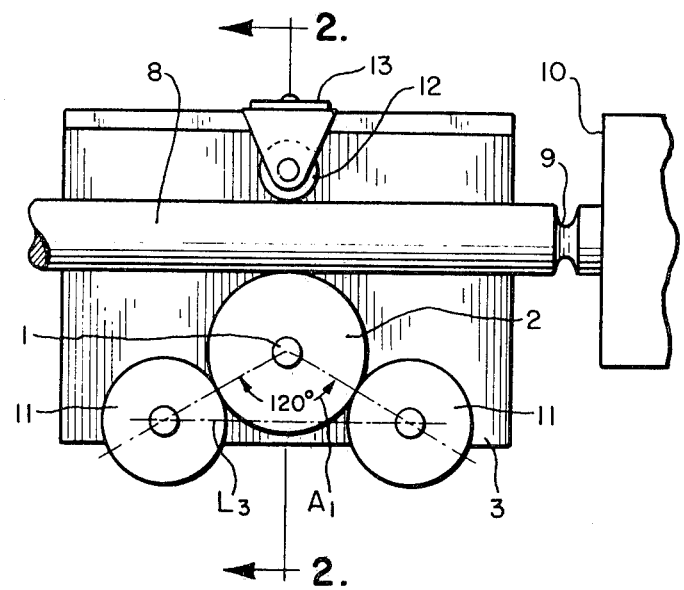
FIG. 1 is a plan view of a play-free precision drive apparatus which includes a first preferred embodiment of this invention for longitudinally driving a driven element.
Figure 2:
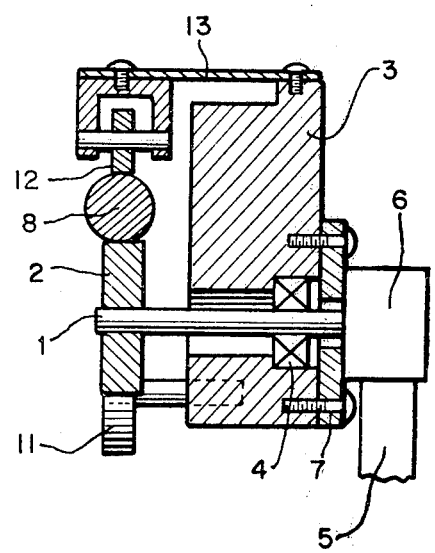
FIG. 2 is a sectional view of the apparatus of FIG. 1 taken along line 2'2 of FIG. 1.

Referring to the embodiment of the play-free precision drive apparatus shown in FIGS. 1 and 2, a rotatable friction drive wheel 2 is mounted on a drive shaft 1. The drive shaft 1 is mounted in a standard bearing 4 which is carried by a stationary casing 3. The shaft 1 is connected to a gear assembly 6 which is driven by a driving means 5 such as a motor. The gear assembly 6 is secured to a mounting plate 7 which is carried by the casing 3.

The friction wheel 2 longitudinally drives a cylindrical drive rod 8. The drive rod 8 is connected over a weakened portion in the form of a notch 9 to a longitudinally movable driven element 10, such as a linearly movable slide.

To keep the friction wheel 2 in engagement with the drive rod 8, a contact pressure roller 12 biases the drive rod against the friction wheel 2. The contact pressure roller 12 is mounted on a leaf spring 13 which in turn is mounted onto the casing 3. The spring 13 provides the biasing force to the contact pressure roller 12 necessary to keep the friction wheel 2 and the drive rod 8 in frictional engagement.

Along its periphery the friction wheel 2 abuts on two support rollers 11. Each support roller is mounted on standard bearings (not shown) which are carried by the casing 3. The geometrical relationship of the assembly of the friction wheel 2 and the support rollers 11 is such that an angle $A_1$ which is defined by the center of the friction wheel 2 and the centers of the support rollers 11 and which has its apex at the center of the friction wheel 2 is 120°. Furthermore, the line $L_3$ which is defined by the centers of the two support rollers 11 is parallel to the drive rod 8, to the longitudinally movable driven element 10, as well as to the tagent line to the friction wheel 2 which passes through the contact point between the friction wheel 2 and the drive rod 8.

Because of the geometric relationship between the friction wheel 2 and the support rollers 11, no play occurs in the drive direction even though the standard bearings which carry the support rollers 11 and the bearing 4 of the friction wheel 2 may have play in them. And since only some of the roller, or ball, elements of the support roller bearings closest to the points of contact between the friction wheel 2 and the support rollers 11 are load-bearing due to the absence of bearing bias tension, the play-free precision drive of FIGS. 1 and 2 is a low-friction, easily rotating one, capable of turning at high speeds.

Figure 3:
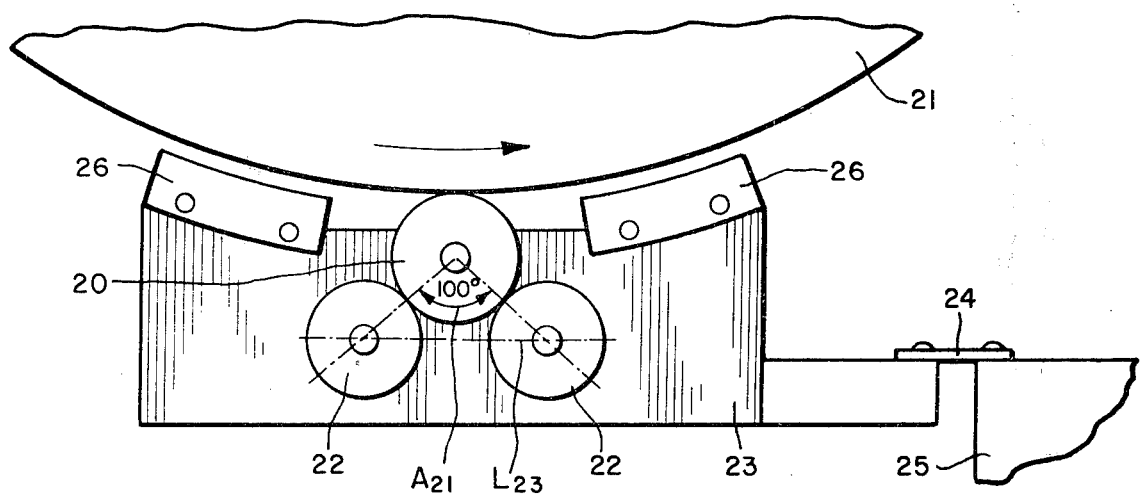
FIG. 3 is a plan view of a play-free precision drive apparatus which includes a second preferred embodiment of this invention for rotating a turntable.

Turning now to the embodiment of the play-free precision drive apparatus shown in FIG. 3, this apparatus is structurally very similar to the apparatus shown in FIGS. 1 and 2. The apparatus of FIG. 3 is modified to perform the function of rotating a turntable, as opposed to longitudinally driving a linear element.

FIG. 3 shows a friction wheel 20 which engages a peripheral surface of a driven rotatable turntable 21. The friction wheel 20 is mounted on standard bearings (not shown) and is driven by a motor (not shown). Two magnets or vacuum elements 26 urge the friction wheel 20 into engagement with the peripheral surface of the turntable 21, and also into engagement with two support rollers 22 which abut the friction wheel 20 along its periphery. Each support roller 22 is mounted on standard bearings (not shown) borne by a casing 23. The casing 23 is mounted by a leaf spring 24 to a stationary base 25. The flexibility of the spring 24 allows the precision drive apparatus to follow the contours of the periphery of the turntable 21.

The geometrical relationship of the assembly of the friction wheel 20 and the support rollers 22 is such that an angle $A_{21}$ which is defined by the center of the friction wheel 20 and the centers of the support rollers 22 and which has its apex at the center of the friction wheel 20 is 100°. Furthermore, a line $L_{23}$ which is defined by the centers of the two support rollers 11 is parallel to a tangent of the friction wheel 20 which passes through the contact point between the friction wheel 20 and the turntable 21. Again, because of these geometric relationships, no play occurs in the drive direction even though the bearings which carry the support rollers 22 and the friction wheel 20 may themselves have play.

Of course, it should be understood that various changes and modifications to the preferred embodiments described above will be apparent to those skilled in the art. For example, the drive element and the support elements can be constructed as gear wheels. Instead of the roller bearings for mounting the drive element and the support elements, slide bearings or bushings may also be used. In addition, the angular relationship between the suport elements and the drive element may be varied up to an angle of 180°. These and other changes can be made without departing from the spirit and the scope of the invention and without diminishing its attendant advantages. It is therefore intended that such changes and modifications be covered by the following claims.

I claim:

1. A play-free precision drive apparatus comprising:
   a rotatable drive element for driving a driven element;
   two rotatable support elements positioned to support the drive element such that each support element abuts the drive element along its periphery, wherein the support elements are positioned such that the centers of the support elements and the center of the drive element define an angle of less than 180° having its apex at the center of the drive element, such that the centers of the support elements define a line substantially parallel to a tangent to the drive element which passes through a contact point between the drive element and the driven element, and such that each support element defines a respective axis of rotation oriented perpendicularly to the direction of motion of the contact point; and
   biasing means for urging one of the driven element and the drive element into engagement with the other.

2. The apparatus of claim 1 wherein the drive element comprises a friction wheel and each support element comprises a roller.

3. The apparatus of claim 1 wherein each one of the drive element and the support elements comprises a gear.

4. The apparatus of claim 1 wherein the biasing means comprises a spring-mounted roller.

5. The apparatus of claim 1 wherein the biasing means comprises at least one magnet.

6. The apparatus of claim 1 wherein the axis of rotation of the drive element is oriented parallel to the axes of rotation of both of the support elements.

7. A precision drive apparatus for a rotatable or longitudinally shiftable driven part, said drive apparatus comprising:
   a rotatable drive element for driving the driven parts;
   means for biasing the drive element and the driven part together such that the drive element is drivingly engaged with a driven portion of the driven part adjacent the drive element, said drive element defining an axis of rotation oriented perpendicularly to the direction of movement of the driven portion of the driven part; and
   two rotatable support elements positioned to support the drive element such that each support element contacts the drive element along its periphery, such that each of the support elements defines a respective axis of rotation oriented parallel to one another and perpendicular to the direction of movement of the driven portion of the driven part, and such that the angle between the centers of the support elements and the center of the drive element is less than 180°, with the apex of the angle at the center of the drive element.

8. The apparatus of claim 7 wherein the drive element comprises a friction wheel and each support element comprises a roller.

9. The apparatus of claim 7 wherein each one of the drive element and the support elements comprises a gear.

10. The apparatus of claim 7 wherein the biasing means comprises a spring-mounted roller.

11. The apparatus of claim 7 wherein the biasing means comprises at least one magnet.

12. The apparatus of claim 7 wherein the axis of rotation of the drive element is oriented parallel to the axes of rotation of both of the support elements.

* * * * *